United States Patent
Bowman et al.

(10) Patent No.: US 11,519,634 B2
(45) Date of Patent: Dec. 6, 2022

(54) ATMOSPHERIC MOISTURE CONDENSING AND HYDROPONIC GERMINATION

(71) Applicant: Tsunami Products, Liberty Lake, WA (US)

(72) Inventors: Ted Bowman, Liberty Lake, WA (US); Kevin Collins, Liberty Lake, WA (US); Charles Lormis, Liberty Lake, WA (US)

(73) Assignee: Tsunami Products, Liberty Lake, WA (US)

( * ) Notice: Subject to any disclaimer, the term of this patent is extended or adjusted under 35 U.S.C. 154(b) by 149 days.

(21) Appl. No.: 16/118,253

(22) Filed: Aug. 30, 2018

(65) Prior Publication Data

US 2019/0063786 A1 Feb. 28, 2019

Related U.S. Application Data

(60) Provisional application No. 62/552,315, filed on Aug. 30, 2017.

(51) Int. Cl.
| | |
|---|---|
| *F24F 13/22* | (2006.01) |
| *A01G 9/24* | (2006.01) |
| *A01G 31/02* | (2006.01) |
| *F24F 3/14* | (2006.01) |

(52) U.S. Cl.
CPC ............ *F24F 13/222* (2013.01); *A01G 9/246* (2013.01); *A01G 9/247* (2013.01); *A01G 31/02* (2013.01); *F24F 2003/1446* (2013.01); *F24F 2013/227* (2013.01); *F24F 2013/228* (2013.01)

(58) Field of Classification Search
CPC .. F24F 13/22; F24F 13/222; F24F 2003/1446; F24F 2013/227; F24F 2013/228; F24F 2140/30; A01G 9/246; A01G 9/247; A01G 31/02; B01D 5/0015; B01D 5/0003; B01D 5/009; B01D 53/265; E03B 3/28; F25D 21/14
See application file for complete search history.

(56) References Cited

U.S. PATENT DOCUMENTS

| | | | | |
|---|---|---|---|---|
| 1,967,518 A | * | 7/1934 | Dent ................... | F25D 21/14 |
| | | | | 62/281 |
| 5,400,607 A | * | 3/1995 | Cayce ................. | F24F 12/00 |
| | | | | 62/90 |
| 5,893,408 A | * | 4/1999 | Stark .................. | F28D 9/0062 |
| | | | | 165/66 |

(Continued)

OTHER PUBLICATIONS

Invitation to Pay Additional Fees dated Nov. 6, 2018 for PCT Application No. PCT/US2018/048952, 3 pages.

(Continued)

*Primary Examiner* — Joseph F Trpisovsky
(74) *Attorney, Agent, or Firm* — Lee & Hayes, P.C.

(57) ABSTRACT

A system comprising a conditioning system with one or more cooling coils configured to allow air to pass through the cooling coils to reduce a temperature of the air as well as an extraction portion with a plurality of condensing plates configured to receive conditioned air and configured to cause a portion water vapor of the conditioned air to collect and form liquid water, and a reservoir configured to receive collected liquid water from the plurality of condensing plates.

14 Claims, 8 Drawing Sheets

(56) References Cited

U.S. PATENT DOCUMENTS

| | | | |
|---|---|---|---|
| 8,627,673 B2* | 1/2014 | Hill | E03B 3/28 62/291 |
| 2004/0244398 A1 | 12/2004 | Radermacher et al. | |
| 2007/0079624 A1* | 4/2007 | Max | B01D 53/265 62/285 |
| 2008/0276630 A1* | 11/2008 | Lukitobudi | B01D 5/0057 62/93 |
| 2008/0314062 A1 | 12/2008 | Ritchey | |
| 2009/0260385 A1 | 10/2009 | Hill et al. | |
| 2011/0283730 A1* | 11/2011 | Tudor | F24F 13/222 62/264 |
| 2012/0221198 A1 | 8/2012 | Kohavi et al. | |
| 2012/0325343 A1* | 12/2012 | Mayer | C02F 9/00 137/544 |
| 2013/0145782 A1* | 6/2013 | Ritchey | F25B 39/02 62/119 |
| 2013/0255280 A1 | 10/2013 | Murphy et al. | |
| 2014/0138236 A1 | 5/2014 | White | |
| 2016/0030858 A1* | 2/2016 | Giacomini | E03B 3/28 62/291 |
| 2016/0333553 A1 | 11/2016 | Dorfman | |
| 2019/0316793 A1* | 10/2019 | Ho | F24F 3/12 |

OTHER PUBLICATIONS

PCT Search Report and Written Opinion dated Jan. 16, 2019 for PCT Application No. PCT/US2018/048952, 10 pages.

* cited by examiner

300

ATMOSPHERIC MOISTURE CONDENSING AND HYDROPONIC GERMINATION

RELATED APPLICATIONS

This Application claims priority to U.S. Provisional Patent Application No. 62/552,315, filed Aug. 30, 2017, which is incorporated herein by reference.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

This disclosure describes techniques and systems for condensing water from the atmosphere. For example, potable water may be harvested from the atmosphere and distributed using some of the techniques discussed herein.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes techniques and systems for condensing water from the atmosphere. For example, potable water may be harvested from the atmosphere and distributed using some of the techniques discussed herein.

The need for potable water is evident for life throughout the entire world. Recent global climate changes have decreased the available amount of clean drinking water which can be easily obtained through conventional means; such as rivers, lakes, rain water runoff and wells/boreholes.

However, within the earth's atmosphere, the ambient humidity is sufficient to satisfy the water needs of every human. If this humidity can be economically and efficiently harvested, it would offer a major source of potable water. The past problems encountered with conventional atmospheric were typically that of expensive input energy to production efficiency. Over the past decade, huge forward steps have been made in industry to offer more efficient power generation options. This, combined with more efficient technology in the area of refrigeration, has helped to reduce the cost for producing water from the atmosphere. However, the embodiments discussed herein provide further advancements in that field. Various embodiments provide more efficient techniques and systems to collect moisture from the atmosphere and generate potable and filtered water.

Generally, Atmospheric Water Harvesters are machines that use a refrigeration principle to lower the temperature of any given unit of ambient air—thus causing moisture to condense out of this air onto a manageable surface for collection. This concept has been used in prior designs; however the efficiency has typically been low by energy rating standards.

While the science behind this type of water production is fairly simplistic in idea, effecting the technique in an engineered mechanical apparatus is not. For example, because of varying air temperatures and relative humidity at those temperature levels, humidity responds differently with respect to coalescing and condensing. As such, to manipulate the moisture and force it to condense, elaborate structuring of surfaces may be designed. Additionally, such things as: air velocities, directional air flow, temperature control (among other variables) are taken into account and designed into the machine.

Various embodiments contemplate addressing these characteristics to create an efficient atmospheric water harvester.

Illustrative System

Figure 1:
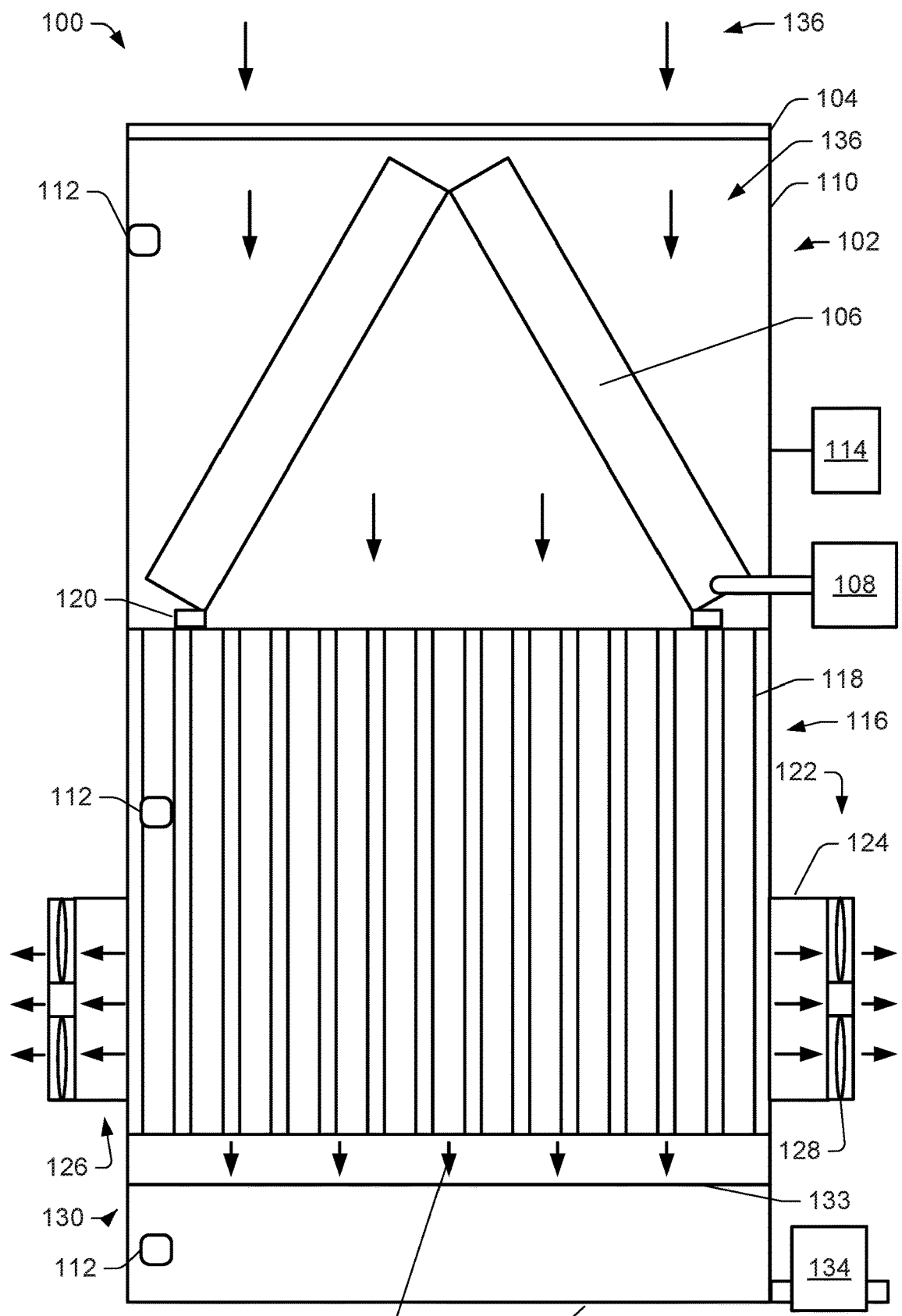
FIG. 1 is a view of an illustrative embodiment of an Atmospheric Moisture Condensing System (AMCS).

FIG. 1 shows an illustrative embodiment of an Atmospheric Moisture Condensing System (AMCS) 100. For example, AMCS 100 may include an atmospheric intake and conditioning portion 102. The atmospheric intake and conditioning portion 102 may comprise an intake filter 104 and refrigeration coil assembly 106. Various embodiment contemplate that the refrigeration coil assembly 106 may be functionally coupled to a compressor system 108. Additionally or alternatively, the atmospheric intake and conditioning portion 102 may include ducting 110 to direct, accommodate, and contain airflow through the atmospheric intake and conditioning portion 102. Additionally or alternatively, the atmospheric intake and conditioning portion 102 may include sensors 112 to monitor conditions in the system. For example, sensors 112 may be configured to monitor one or more of air velocities, directional airflow, temperature, humidity, reservoir levels, among other conditions. Additionally or alternatively, sensors 112 may be configured to monitor various conditions continuously, intermittently, and/or based on a triggering condition. Additionally or alternatively, sensors 112 may be configured to operate and monitor various conditions independently of other sensors 112. Additionally or alternatively, sensors 112 may be communicatively connected to control system 114. Additionally or alternatively, sensors 112 may be connected with control system 114 using wired or wireless communication technology.

Additionally or alternatively, AMCS 100 may include an extraction portion 116. The extraction portion 116 may comprise plates 118, for example, cool plates. Various embodiments contemplate that condensing plates 118 may be stainless steel or other suitable material. Various embodiments contemplate that condensing plates 118 may be thermally coupled to refrigeration coil assembly 106 directly or through a thermal bridge 120. Additionally or alternatively, various embodiments contemplate the condensing plates 118 not being thermally coupled to refrigeration coil assembly 106 through a thermal bridge 120 or directly. Various embodiments contemplate that condensing plates 118 may be situated adjacent to each other in a distributed orientation. Various embodiments contemplate a ¼" spacing between individual condensing plates. Additionally or alternatively, various embodiments contemplate that condensing plates 118 may include a suitable number of plates sized for a desired production. For example, various embodiment contemplate that the condensing plates 118 may include between 120 and 140 plates and may be approximately 20"×30" of 20 gauge stainless steel. The extraction portion 116 may also include ducting 122 that may direct a flow from the atmospheric intake and conditioning portion 102 across the condensing plates 118 to an outlet duct 124/126. Additionally or alternatively, flow through the ducts may be effected by use of a fan system 128.

Additionally or alternatively, AMCS 100 may include a collection portion 130. For example, collection portion 130 may comprise a reservoir pan 132. Additionally or alternatively, reservoir pan 132 may be in fluid communicate with a liquid management system 134. Various embodiments contemplate that liquid management system 134 may include a pump system configured to move the extracted liquid from the reservoir pan 132. Various embodiments contemplate that the extracted liquid may be moved through various filter systems including, but not limited to UV filter, activated charcoal filters, among others. Additionally or alternatively, various embodiments contemplate that the extracted liquid may be moved though the liquid management system 134 to another holding tank, distributed, bottled, or otherwise used.

Additionally or alternatively, various embodiments contemplate that an illustrative system may comprise a conditioning portion comprising one or more cooling coils configured to allow air to pass through the cooling coils to reduce a temperature of the air as well as an extraction portion coupled to the conditioning portion, configured to receive conditioned air from the conditioning portion, the extraction portion comprising a plurality of condensing plates configured to cause a portion water vapor of the conditioned air to collect and form liquid water on the plurality of condensing plates.

Additionally or alternatively, various embodiments contemplate that the system may also include a reservoir coupled to the extraction portion configured to receive collected liquid water from the plurality of condensing plates.

Additionally or alternatively, various embodiments contemplate that the system may also include an air flow management system configured to direct intake air across a portion of the plurality of condensing plates and to direct exhaust air from the system.

Additionally or alternatively, various embodiments contemplate that the system may also include a liquid management system configured to move the extracted liquid from the reservoir pan. Additionally or alternatively, the liquid management system may be further configured to move the extracted liquid through one or more filters. For example, the one or more filters may include one or more of a UV filter, an activated charcoal filter, or a combination thereof, among others.

Illustrative Technique

Figure 2:
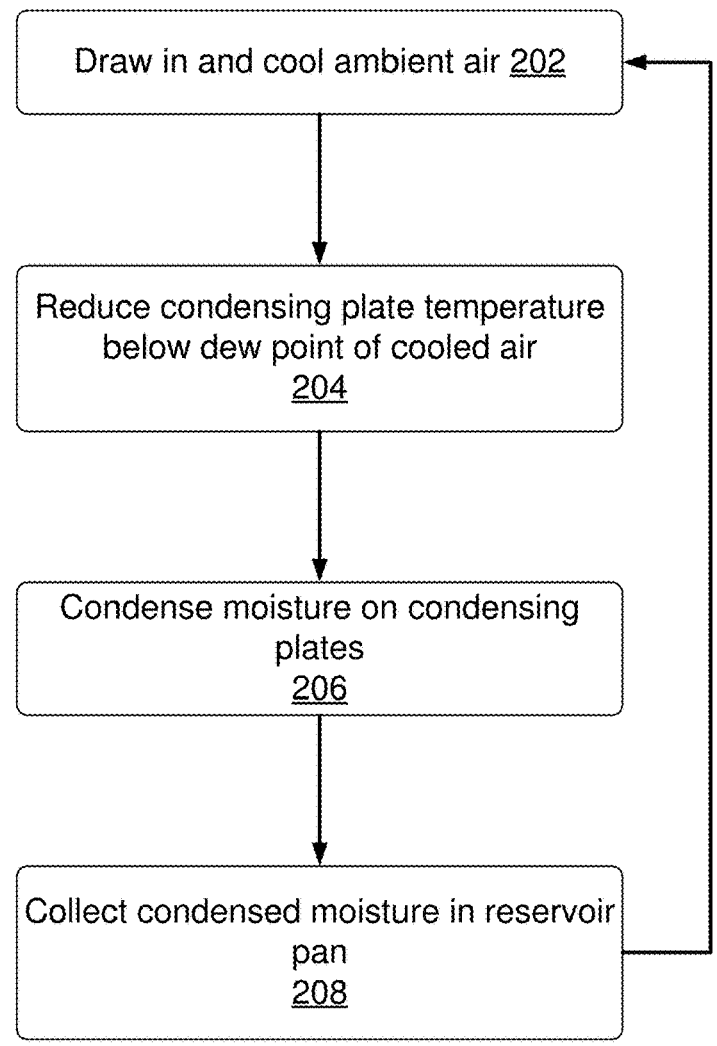
FIG. 2 is an illustrative technique using the AMCS.

FIG. 2 shows an illustrative water extraction technique 200. For example, at 202, various embodiments contemplate that filtered ambient air 136 is drawn into the AMCS 100 by fans, for example, axial fans. The air 136 passes through the refrigeration coil assembly 106. Here, the coolant may expand and remove heat from the air 136. The air 136 is then cooled to a sufficient level and then travels vertically downward between condensing plates 118.

At 204, as the cooled incoming ambient air 136 passes through the condensing plates 118, heat from the plate system is transferred into the airstream and exhausted from the AMCS 100 through outlet duct 126. As this process continues, the effective temperature of the condensing plates 118 is reduced until they become at or below the dew point of the air 136.

At 206, as this happens, moisture starts to form on the plates and condenses into larger droplets 138, which, by gravity, drops into the reservoir pan 132.

At 208, the larger droplets 138 are collected in the reservoir pan 132, where, in some embodiments, before dropping into the reservoir pan 132, the droplets 138 may pass through a sieve/screen 133. This screen 133 not only catches any foreign debris that might have inadvertently passed through the condensing plates 118, but may also acts as a substantial air barrier to help prevent the exhausting air from re-evaporating water back into the air.

Various embodiments contemplate that temperature and humidity parameters for this process may be closely monitored by use of sensors 112 and fan speed controllers. The refrigeration system may be adjusted to a specific range of cooling so that the dew point can be manipulated precisely to match the ambient air conditions.

The exhausted system air may be ducted to the outside, or may be recovered for various needs such as zone cooling, as desired. This exhausted air is cool and dry when compared to the incoming ambient air.

Various embodiments contemplate that the water filtration system may include float units and an inline strainer filter, a diaphragm pump, a cartridge filter unit, a UV lamp, manual diverting valves, and solenoids for dispensing.

Additionally or alternatively, various embodiments contemplate that after the water in the reservoir pan 132 reaches a predetermined level, the liquid management system 134 starts the flow of fresh water through the filter and UV system. This circulation may continue until the water is removed from the system or an additional monitoring control sends it to an outside reservoir.

Additionally or alternatively, various embodiments contemplate that control system 114 may also control the fans and cooling system. For example, control system 114 may be connected to sensors 112 as well as sensors outside of unit. For example, atmospheric conditions may be monitored, a remote reservoir level may be monitored. Additionally or alternatively, various embodiments contemplate control system 114 may be coupled to a predictive system that may determine a predicted demand or predicted atmospheric conditions. For example, a predicted demand may trigger the AMCS to begin generation sufficiently prior to the demand to be able to meet it. Additionally or alternatively, the AMCS may be triggered to begin generating since predicted atmospheric conditions may cause the unit to operate less effectively.

Additionally or alternatively, various embodiments contemplate that an illustrative technique may comprise extracting a first amount of heat from a coolant and transferring the coolant to a refrigeration coil assembly. For example, the first amount of heat may be extracted from a coolant by extracting the heat through a heat exchanger.

Additionally or alternatively, various embodiments contemplate transferring a second amount of heat to the coolant from the refrigeration coil assembly and a plurality of cooling plates. Further, various embodiments contemplate receiving ambient air with a first level of moisture and passing ambient air through the refrigeration coil assembly and the plurality of cooling plates. Further, based at least in part on a difference of heat between the refrigeration coil assembly and the plurality of cooling plates and the ambient air, removing a first amount of moisture from the ambient air reducing the ambient air to a second level of moisture, and collecting at least a portion of the removed first amount of moisture in liquid form. For example, the removing the first amount of moisture may include reducing a temperature of the ambient air to below a temperature threshold causing moisture from the ambient air to condense and liquify on the plurality of cooling plates. Where, for example, the temperature threshold may be a dew point of the ambient air.

Additionally or alternatively, various embodiments contemplate that the removed first amount of moisture in liquid form may include collecting liquid droplets through gravity.

Figure 3:
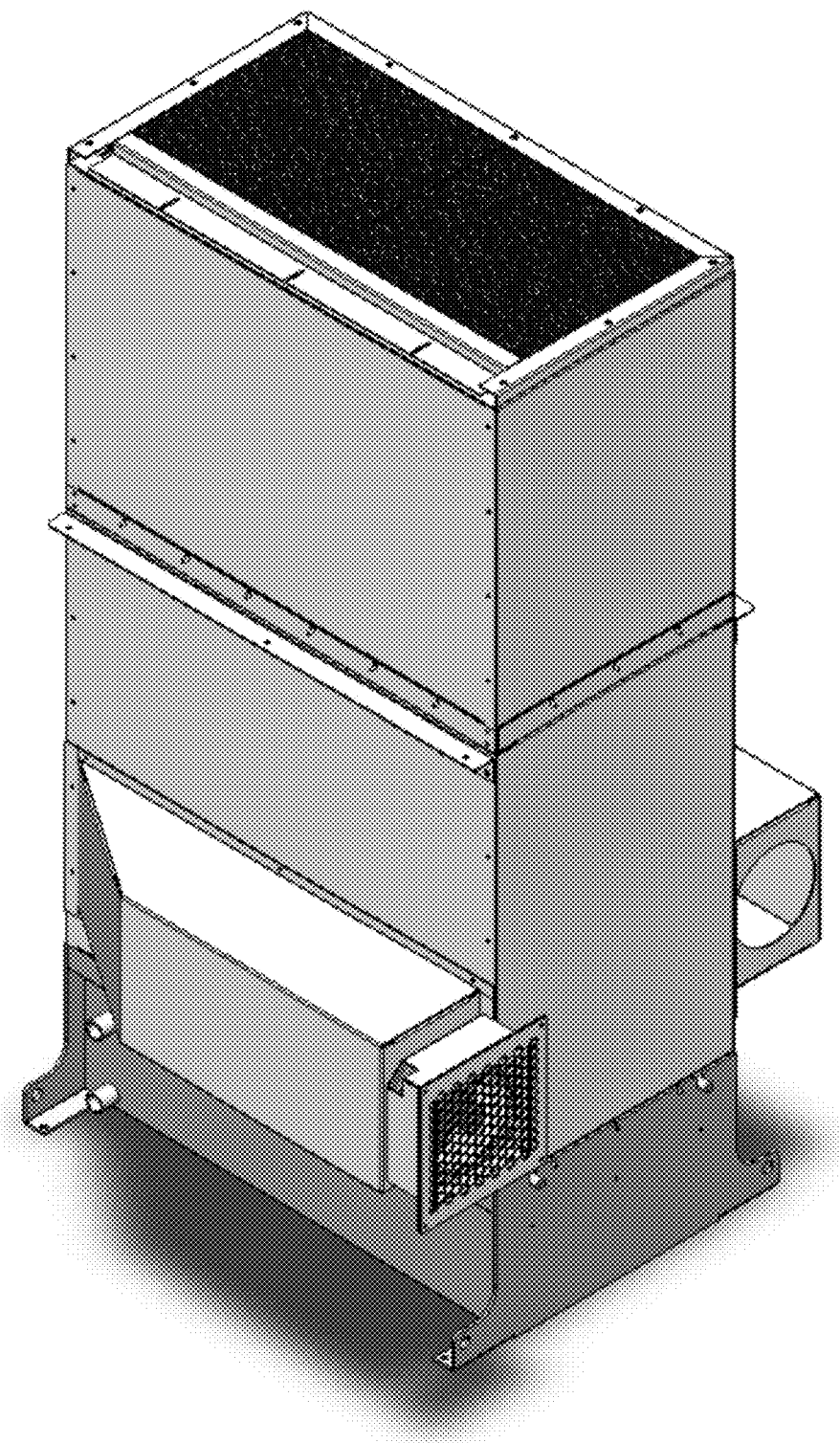
FIGS. 3-6 are views of an illustrative AMCS.
Figure 4:
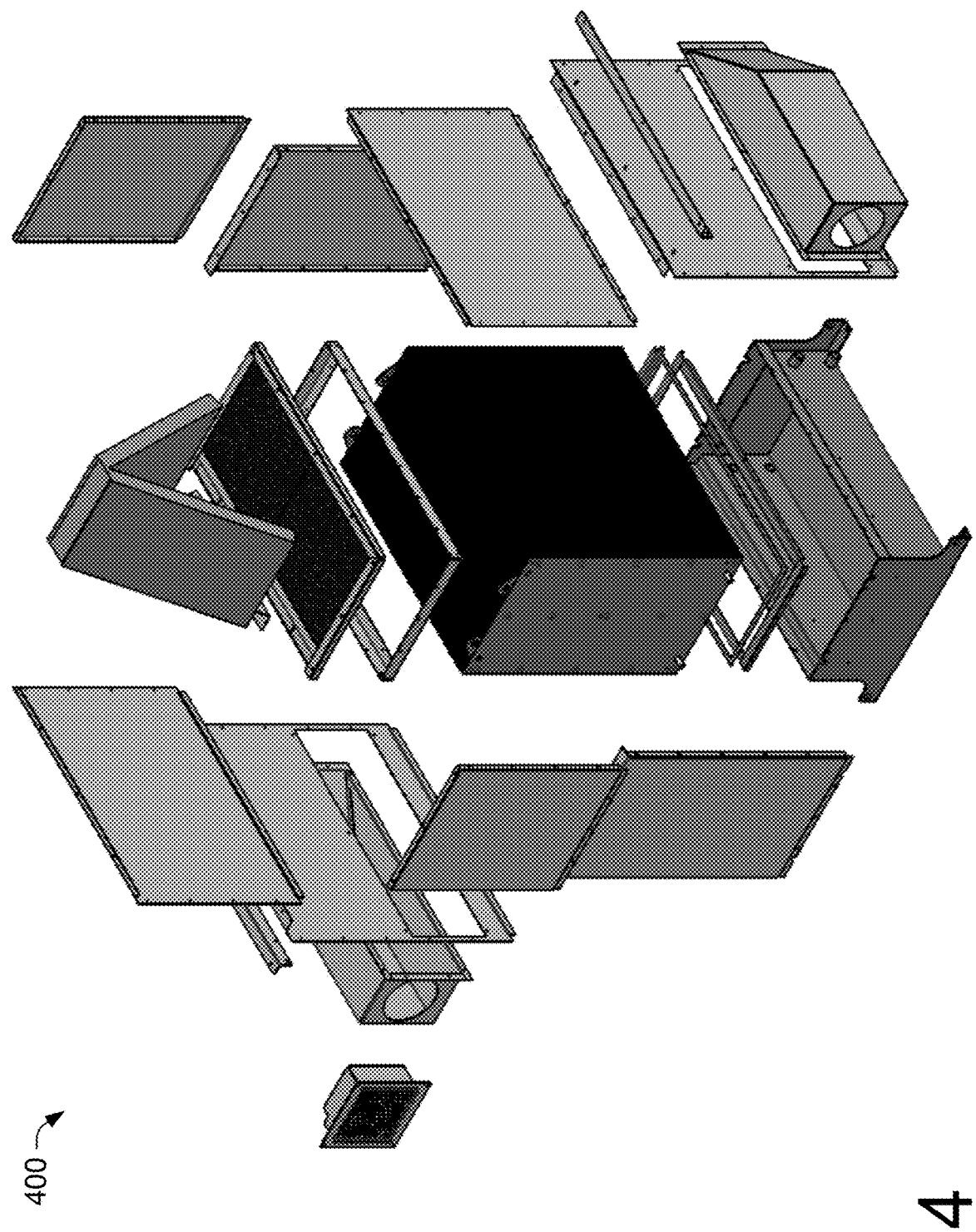
Figure 5:
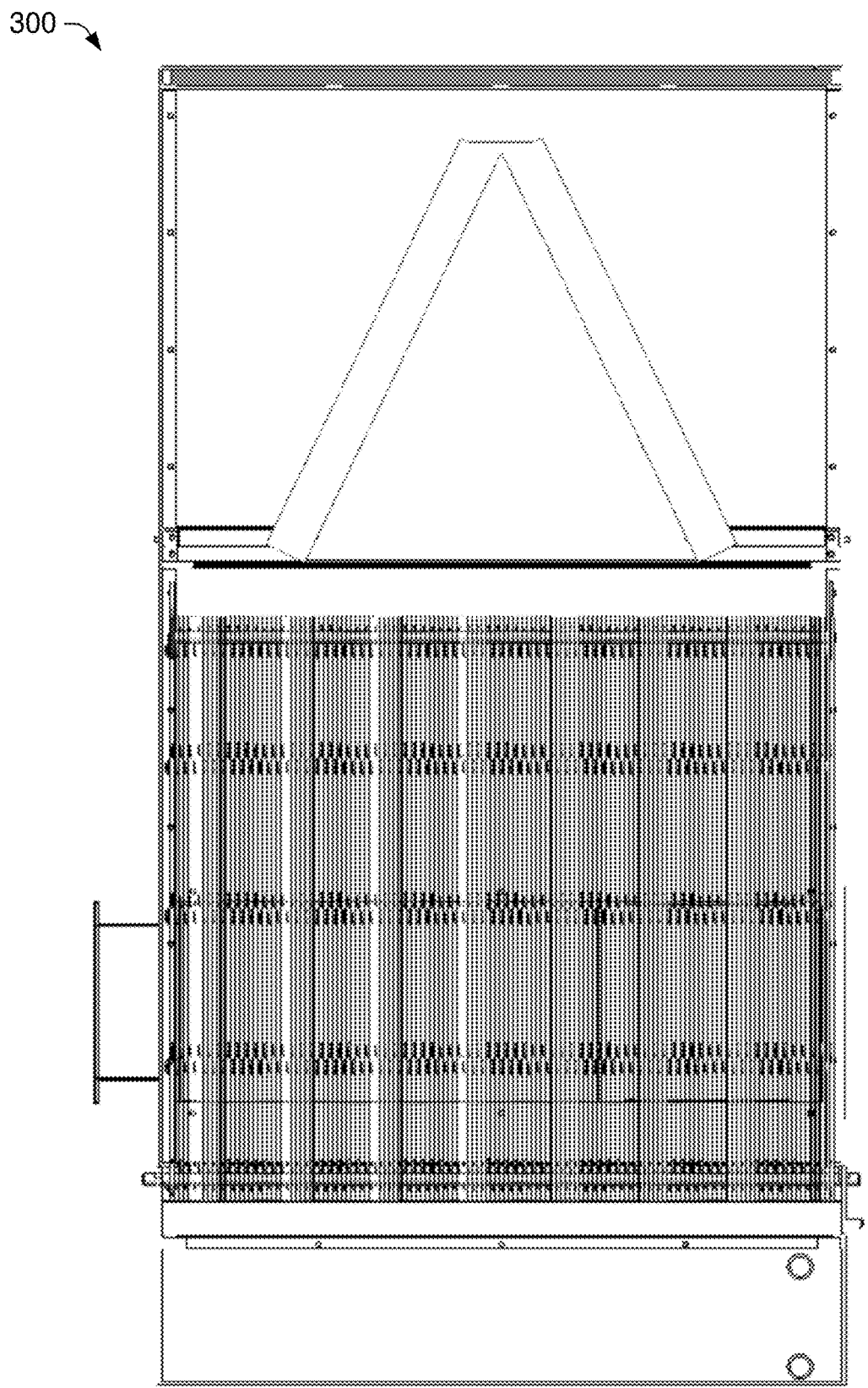
Figure 6:
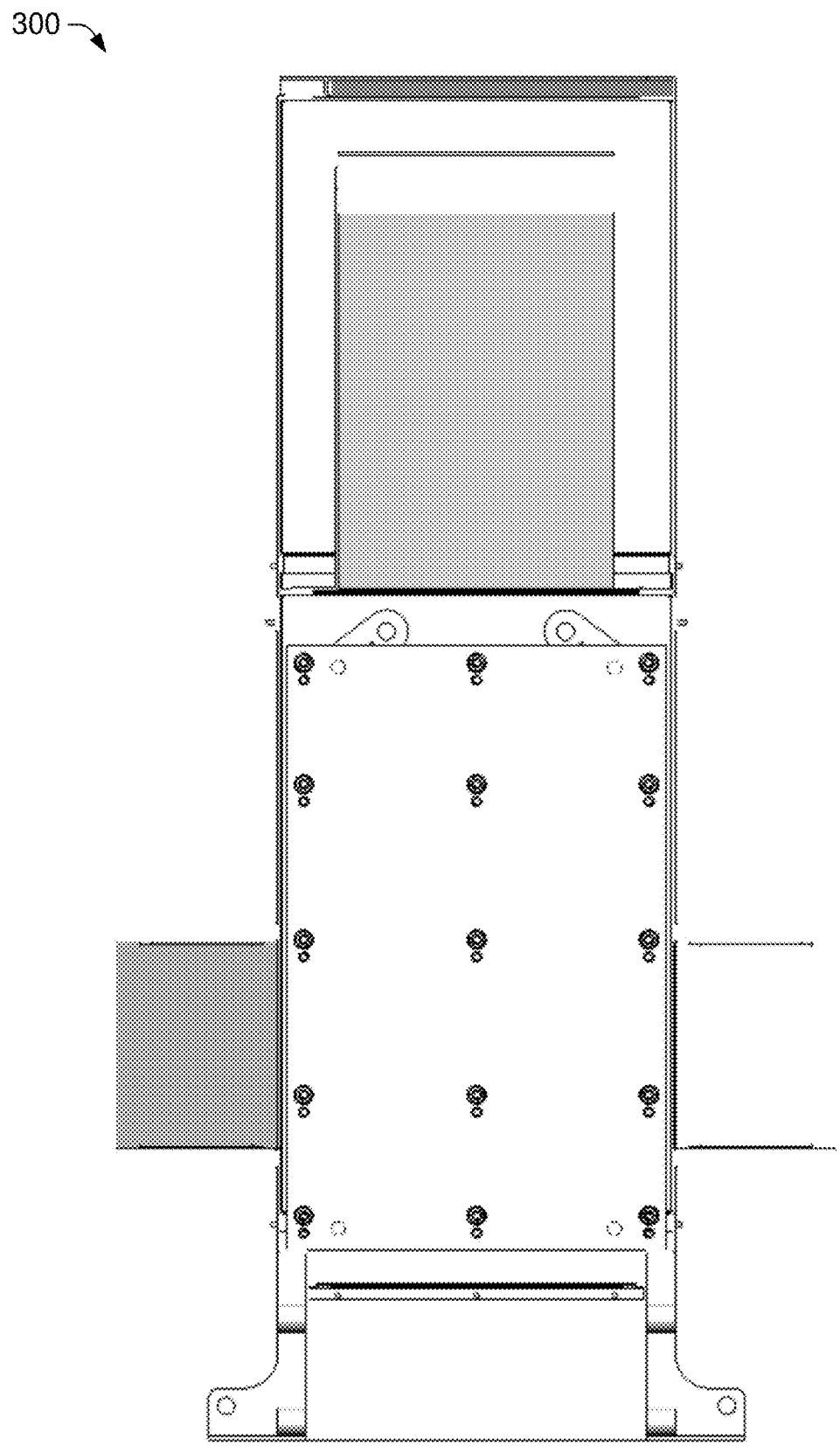

FIGS. 3-6 show views of an additional embodiment of an AMCS. For example, FIG. 3 shows a perspective view of an embodiment of AMCS 300. FIG. 4 shows an exploded view of an AMCS 400. FIG. 5 shows a cutaway view of AMCS 300. FIG. 6 shows a cutaway view of AMCS 300 with the plane of intersection rotated approximately perpendicular to the plane of intersection shown in FIG. 5.

Illustrative Fodder System

Figure 7:
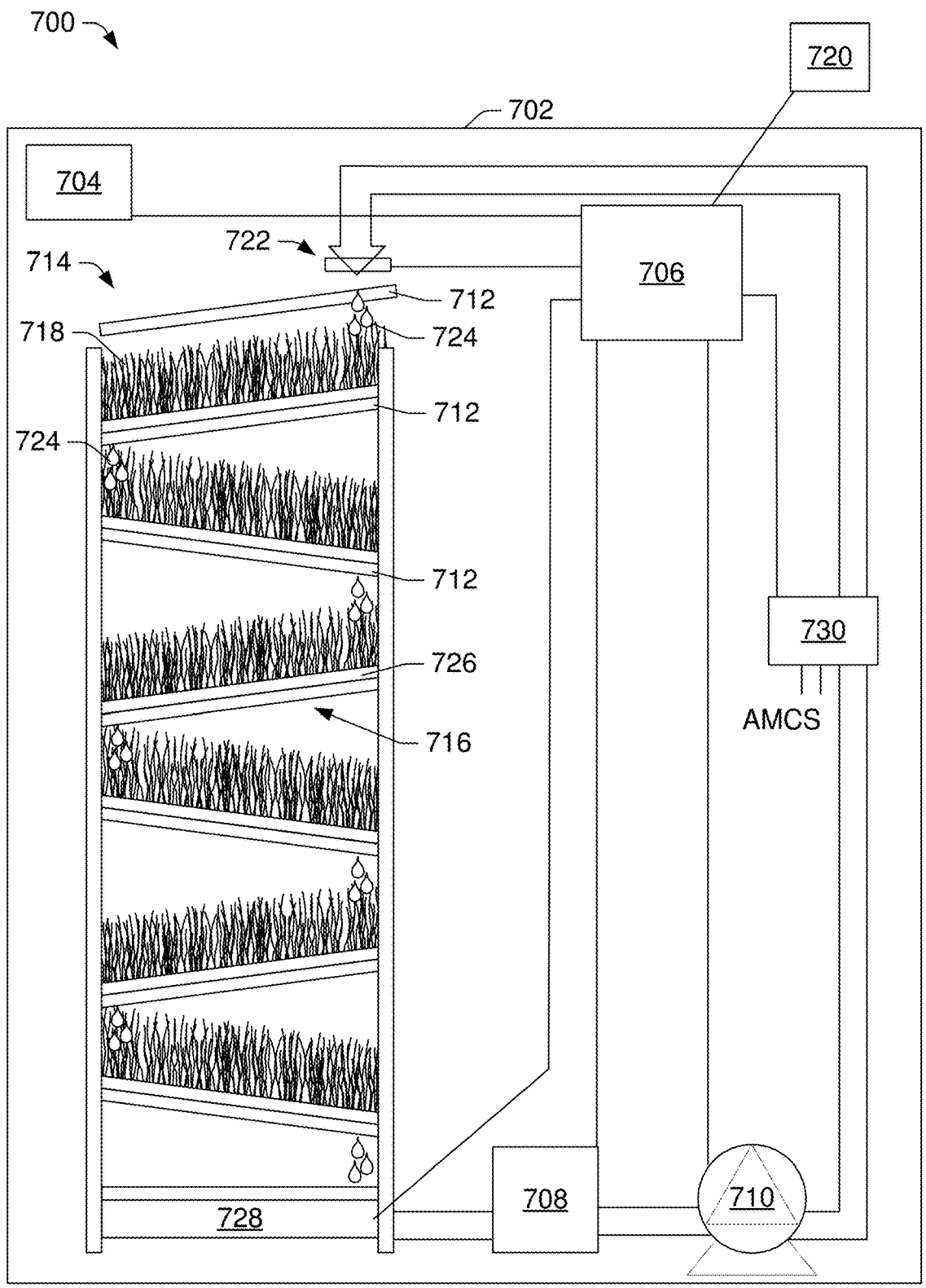
FIG. 7 is a view of an illustrative hydroponic germination fodder system.

FIG. 7 shows an illustrative fodder system 700. Various embodiments contemplate that the fodder system 700 may be coupled to or paired with a AMCS as discussed above. For purposes of this disclosure, fodder is an animal feed which is live, recently harvested plants, leaves, grasses, or combinations thereof. Various embodiments contemplate that fodder system 700 leverages innovative techniques in order to produce feed at accelerated growing rates with minimal or reduced cost input to allow for a regular, for example, daily output—normally impossible with natural growing conditions. Another major benefit may be that this type of feeding system may greatly minimize "animal caused erosion" impact due to over grazing of pasture land. Feeding areas for livestock may be located in concentrated areas near compounds and farm centers. Manure may be managed within a specific area and reused as needed on pastures.

While fodder type feed has been available for farmers and ranchers in the past, fodder system 700 represents a unique approach which offers versatility as well as mobility. Additionally, it may be used with AMCS, as discussed above, to provide a constant or regular supply of input water in areas where fodder normally could not be grown.

Various embodiments contemplate that fodder system 700 may include a weather/environmental controlled shelter unit 702, for example, aluminum, which may be fully portable with various techniques such towing or helicopter lifting. Optional towing axles may be attached directly to unit with a drawbar type tongue. Various embodiments contemplate that standardized sizes may be used, for example, 6'×9' and 7'×12' (nominal outside dimensions).

Additionally or alternatively, various embodiments contemplate that fodder system 700 may include a climate control system 704 for heating or cooling as needed. Additionally or alternatively, various embodiments contemplate that fodder system 700 may include an electrically driven monitoring and control systems 706, a filtration/pump system 708/710 for reuse of water within the growing module and timers for controlled, for example, consistent or tailored, watering cycles. Additionally or alternatively, various embodiments contemplate that fodder system 700 may include special product growing lighting system 712.

Additionally or alternatively, various embodiments contemplate that fodder system 700 may include a shelving and growing tray system 714, designed with a slope 716 to allow for proper drainage and growth cycles of fodder 718. Additionally or alternatively, various embodiments contemplate that fodder system 700 may include a remote monitoring device 720 for providing status information including alerting an operator of alarm issues. It is understood that the remote monitoring device 720 may comprise a wired or a wireless connection or a combination thereof to portions of the fodder system 700, for example, weather/environmental controlled shelter unit 702.

Additionally or alternatively, various embodiments contemplate that the fodder system 700 may include a water distribution system 722 which may be coupled to control systems 706 to selectively distribute water 724 into one or more fodder trays 726. Various embodiments contemplate that the water 724 will migrate through the fodder trays 726 allowing the fodder 718 to receive water 724, where the surplus of water 724 is received at catch basin 728. Additionally or alternatively, various embodiments contemplate that the water may be transferred to a filtration/pump system 708/710 for reuse of water 724. Additionally or alternatively, various embodiments contemplate a control valve system 730 coupled to control systems 706 to selectively add water from an AMCS as noted above.

Additionally or alternatively, various embodiments contemplate that a hydroponic germination fodder system may include an environmentally controlled shelter unit with a climate control system configured to control the climate. Additionally or alternatively, various embodiments contemplate a water filtration and pump system configured to condition water and move the water selectively in the system. For example, the water filtration and pump system may feed a plurality of trays configured to hold grain and pass water across the grain from a first region of a tray to a second region of the tray.

Additionally or alternatively, various embodiments contemplate that a shelving system may be configured to hold the plurality of trays at one or more angles aiding the water passing through the trays. For example, trays may be held at an angle sufficient for water to pass from one end to another end or from one side to another side based on gravity. Additionally or alternatively, various embodiments contemplate that they system may have a catch basin configured to receive water collected from the plurality of trays that is not soaked up by the grain as it grows.

Additionally or alternatively, various embodiments contemplate that the system includes a monitor and control system configured to monitor and control one or more of the movement of water, conditions of the environmentally controlled shelter unit, or the climate control system. Additionally or alternatively, various embodiments contemplate that they system may also include a remote monitoring system configured to transmit status information to a user or system.

Additionally or alternatively, various embodiments contemplate that the system may include a growing light system configured to provide a controlled light source to the grain to aid in growing. Additionally or alternatively, various embodiments contemplate that the system may include an atmospheric moisture condensing system configured to provide additional water to the system.

Illustrative Operation

Figure 8:
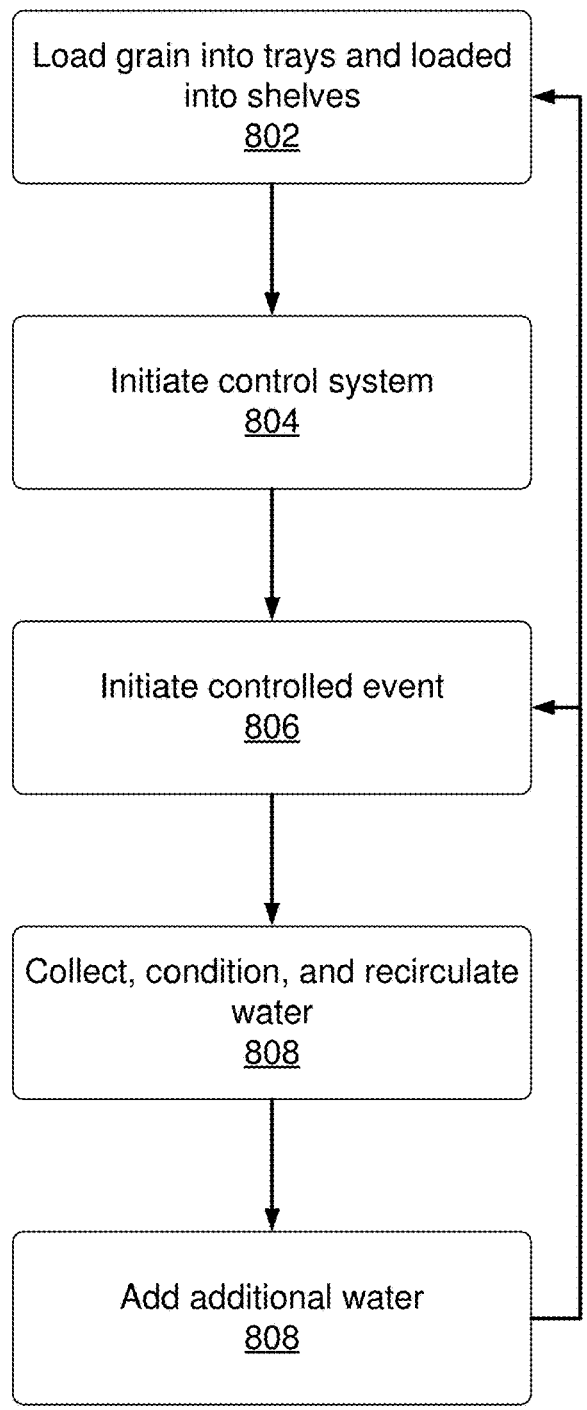
FIG. 8 is an illustrative technique using the hydroponic germination fodder system of FIG. 7.

FIG. 8 shows an illustrative fodder growing technique 800. For example, after the fodder system 700 is placed and leveled at the desired site, electrical power may be provided via local power mains, a generator, or from an AMCS unit's generator.

At 802, various embodiments contemplate that various grain—(which may have been soaked beforehand)—may be loaded onto the trays and inserted into the shelves. Shelves may be numbered by owners as desired to allow for specific recordkeeping system.

At 804, after loading the system, the control system may be activated. For example, the pump system timer may be initiated and temperature control may be activated.

At 806, various embodiments contemplate that fodder system 700 may include a controlled event. For example, every 6 hours, the trays may be automatically flooded with water from a lower catch tank. The specific amount of time for this flooding may be controlled by a preselected time which is determined by type of grain and stage of germination. As the water flows through the sloped trays, it drains through a series of perforations at the lower end of the trays and then drips onto the trays located on the shelf below it. This flow of water continues from tray to tray—top shelf to bottom shelf—until each tray is fully flooded and then drained by gravity.

At 808, after the water reaches the catch tank at the bottom, the system may collect, condition, and recirculate the water. For example, the water may then be recirculated through the filter and UV system and sent back up to the top trays to repeat the flood cycle. This circulation time is dependent on a preselected interval via operator timer control.

Additionally or alternatively, various embodiments contemplate that fodder system 700 may include an alternate pump and filter system that operates independently of the flood cycle pump system. It may use an additional pump, filter, UV light and timer control system. At predetermined times—(set by the operator based on grain quality)—this filtration system may be set to run to continually clean the catch tank water so as to minimize bacteria and smell of recirculated water.

At 810, additional water may be added to the system, based at least in part on a type of grain planted, a stage of the grain's growth, a water level in the catch tank, or combinations thereof among others. For example, as the grain sprouts and grows, it begins to retain more moisture. The catch tank may be sized large enough to allow for this and only requires "make-up" water to be added occasionally. A float may be installed in the catch tank to shut the system down and signal an operator alarm in the event of low water condition. This "make-up" water may be provided either by manual addition or automatic addition from an AMCS unit if attached.

After the initial 6-7 days of growth (exact days of maturity dependent upon types of grain stock used)—the fodder may then be removed and fed to animals.

Additionally or alternatively, various embodiments contemplate that fodder system 700 may include an alternative method for system organization it to do the aforementioned tray loading at different cycles:

For example, instead of loading all the trays at the same time, only one shelf of trays (horizontally) is loaded each day—consecutively. After 7 days, all trays will be fully loaded and the top shelf of trays is ready for harvest. After harvesting and refilling these empty trays, the cycle is repeated. Each subsequent shelf underneath the previous one is harvested and then refilled with pre-soaked grain.

This method may allow for continuous daily feeding. Also, since various embodiments contemplate 7 shelves with 7 trays, a vertical method of filling and harvesting trays may be used.

Additionally or alternatively, various embodiments contemplate that fodder system 700 may include a climate control: For example, fodder system 700 may also have an environmental control system which keeps humidity and temperatures at optimal growing conditions. The temperature may be maintained via the heating and cooling unit. For example, during hotter temperatures, the cooling system not only chills the inside air, but also allows for excess moisture to be collected, condensed and returned to the catch tank. This means that water lost to outside of the fodder unit is reduced or effectively eliminated.

Additionally or alternatively, various embodiments contemplate that fodder system 700 may include a lighting system: For example, after germination and sprouting of the grain, an LED lighting system may help to green-up the stalks of the growing fodder. This also allows the individual stalk to maintain upright growing position so that other grain stalks can breathe freely—thus producing a more lush growth. Various embodiments contemplate placing a light source above each tray or shelf to provide sufficient light to the growing fodder.

Additionally or alternatively, various embodiments contemplate that fodder system 700 may include a fully enclosed and filtered air exchange system. For example, another unique feature is that of the strong metal module is its ability to not only provide a secure operation, but also help eliminate insects from migrating inside. With any type of organic seed germination in warm environments, there is insect nuisance. Small flies are attracted to the smell of the wet grains and will lay eggs which will hatch and produce larvae. In order to minimize this risk, the incoming air may be filtered and mixed with the already temperature conditioned air inside the unit. This may require a modulating vent and fan mechanism which is connected with the environmental control system. Any air (excluding opening of doors for service and operation) may then be filtered.

Additionally or alternatively, various embodiments contemplate that fodder system 700 may include an Electronic Bug control (zapper) unit to operate inside the Fodder unit as a secondary pest control.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments. Any portion of one embodiment may be used in combination with any portion of a second embodiment.

What is claimed is:

1. An atmospheric moisture condensing system comprising:
   a conditioning portion comprising one or more cooling coils configured to allow air to pass through the cooling coils to reduce a temperature of the air;
   an extraction portion coupled to the conditioning portion, configured to receive conditioned air from the conditioning portion, the extraction portion comprising a plurality of condensing plates configured to cause a portion of water vapor of the conditioned air to collect and form liquid water on the plurality of condensing plates;
   a reservoir coupled to the extraction portion configured to receive collected liquid water from the plurality of condensing plates; and
   a control system configured to adjust air flow of the air and a refrigeration level of the system to control a dew point of the air within the system based at least in part on a predicted liquid water demand, a predicted ambient air temperature, and predicted humidity levels.

2. The system of claim 1, further comprising an air flow management system configured to direct intake air across a portion of the plurality of condensing plates and to direct exhaust air from the system.

3. The system of claim 1, further comprising a liquid management system configured to move the extracted liquid from the reservoir.

4. The system of claim 3, the liquid management system further configured to move the extracted liquid through one or more filters.

5. The system of claim 4, the one or more filters comprising one or more of a UV filter or an activated charcoal filter.

6. The system of claim 1, the control system further configured to adjust air flow of the air and the refrigeration to control a dew point of the air within the system based at least in part on a reservoir level, ambient air temperature, and humidity levels.

7. The system of claim 1, wherein the liquid water comprises droplets of water, and wherein the system further comprises a screen configured to pass the droplets of water into the reservoir and reduce evaporation of the liquid water in the reservoir.

8. A method comprising:
controlling, via a control system, an air flow through and refrigeration of an atmospheric moisture condensing system, based at least in part on a predicted liquid water demand, a predicted ambient air temperature, and predicted humidity levels;
conditioning a portion of the air flow, via a conditioning portion comprising one or more cooling coils, reducing a temperature of the air flow;
extracting a portion of water vapor from the conditioned portion of air, via an extraction portion coupled to the conditioning portion comprising a plurality of condensing plates, the extracting comprising causing water vapor of the conditioned air to collect and form liquid water on the condensing plates; and
collecting the liquid water from the condensing plates in a reservoir coupled to the extracting portion.

9. The method of claim 8, further comprises:
directing, via an air flow management system, intake air across a portion of the plurality of condensing plates; and
directing, via the air flow management system, exhaust air from the system.

10. The method of claim 8, further comprises extracting, via a liquid management system, liquid from the reservoir.

11. The method of claim 10, further comprises passing, via the liquid management system, extracted liquid through one or more filters.

12. The method of claim 11, wherein the passing the extracted liquid through one or more filters comprises passing the extracted liquid through one or more of a UV filter or an activated charcoal filter.

13. The method of claim 8, wherein the controlling the air flow through and refrigeration is further based at least in part on a reservoir level, ambient air temperature, and humidity levels.

14. The method of claim 8, wherein the liquid water comprises droplets of water, and wherein the collecting the liquid water comprises passing the droplets of water through a screen into the reservoir.

* * * * *